3 Sheets—Sheet 1.

P. J. HEYMANN & J. E. BURT.
Organ and Piano Case.

No. 213,507. Patented Mar. 25, 1879.

Witnesses
W. J. Cambridge
W. J. Towne

Inventors,
P. Jacob Heymann
John E. Burt

P. J. HEYMANN & J. E. BURT.
Organ and Piano Case.

No. 213,507. Patented Mar. 25, 1879.

3 Sheets—Sheet 3.
P. J. HEYMANN & J. E. BURT.
Organ and Piano Case.
No. 213,507. Patented Mar. 25, 1879.
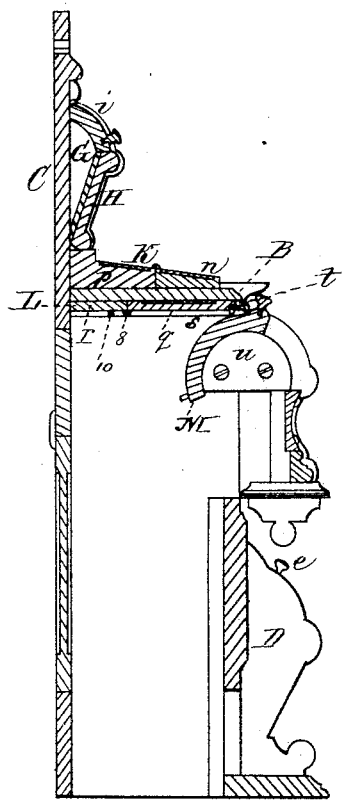
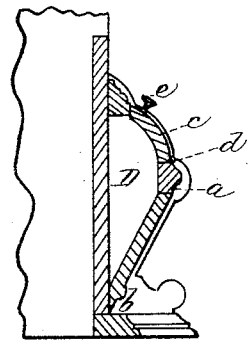
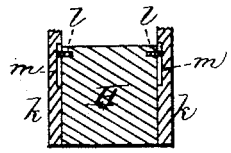
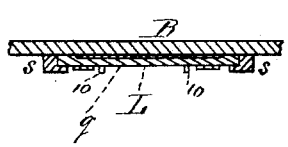
Witnesses
N. J. Cambridge
Wm. J. Towne
Inventors,
P. Jacob Heymann
John E. Burt
per P. E. Teschemacher Atty

UNITED STATES PATENT OFFICE.

P. JACOB HEYMANN AND JOHN E. BURT, OF BOSTON, MASS., ASSIGNORS TO THE NEW ENGLAND ORGAN COMPANY, OF SAME PLACE.

IMPROVEMENT IN ORGAN AND PIANO CASES.

Specification forming part of Letters Patent No. 213,507, dated March 25, 1879; application filed November 25, 1878.

*To all whom it may concern:*

Be it known that we, P. JACOB HEYMANN and JOHN E. BURT, both of Boston, in the county of Suffolk and State of Massachusetts, have invented certain Improvements in Organ and Piano Cases, of which the following is a full, clear, and exact description, reference being had to the accompanying drawings, making part of this specification, in which—

Figure 1:
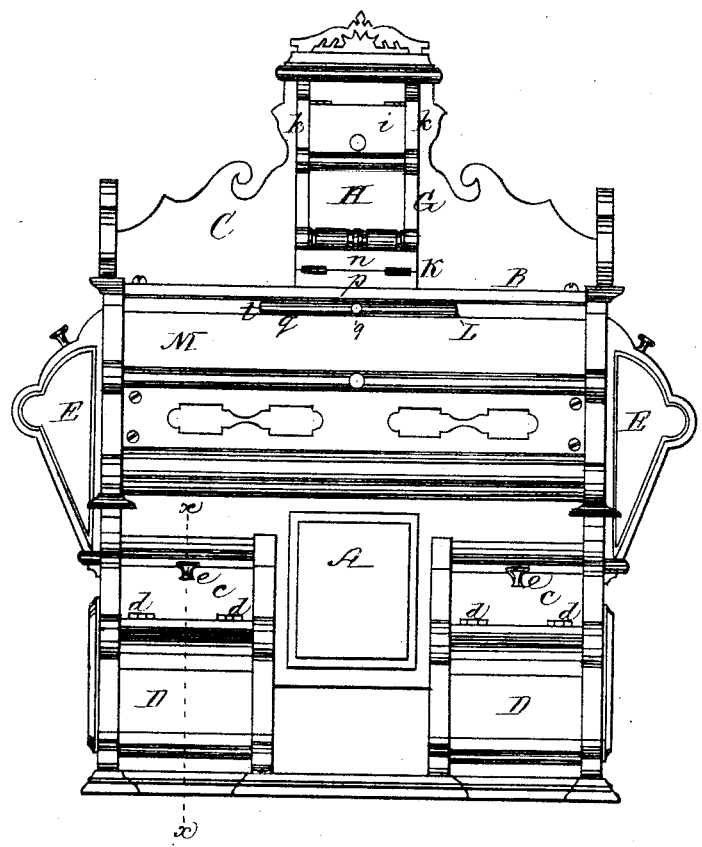
Figure 2:
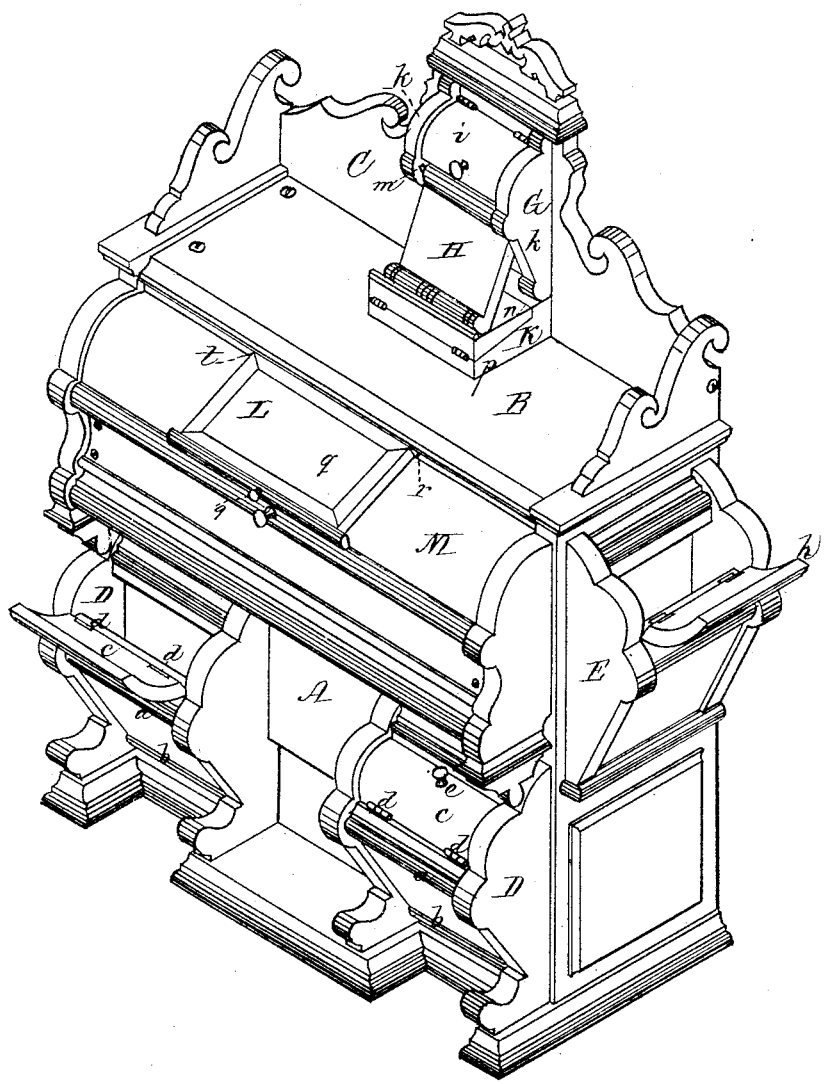

Figure 1 is a front elevation of a cabinet-organ case constructed in accordance with our invention. Fig. 2 is a perspective view of the same, the position of some of the parts being changed. Fig. 3 is a transverse vertical section through the center of the same. Fig. 4 is a vertical section on the line $x\ x$ of Fig. 1; Figs. 5 and 6, details in section.

Our invention relates to certain improvements in organ or piano cases; and consists in an adjustable music-rest located in front of a pocket on the show-board, the bottom of this rest being drawn forward away from the pocket and resting on the top of the case, or a support thereon when the rest occupies its proper inclined position for holding the music.

Our invention also consists in a leaf composed of two portions, hinged together, and made to slide under the top of the case, in combination with the fall-board, which supports it when drawn out, in which position the leaf is inclined and serves as a desk for writing purposes.

To enable others skilled in the art to understand and use our invention, we will proceed to describe the manner in which we have carried it out.

In the said drawings, A represents the front, B the top, and C the show-board or extended top, of a cabinet-organ case. On the outside of the front of the case, below the key-board, and on each side of the foot-board, (not shown,) is located an ornamental pocket, D, the front of which inclines inward and downward to the outside of the case from $a$ to $b$.

Each of these pockets is provided with a lid or cover, $c$, hinged at $d$, and having a knob or handle, $e$, by which it may be opened or closed, these pockets forming convenient receptacles for sheet-music, books, &c., which are thus always within reach of the performer, whereby the necessity of leaving the seat is avoided; and by placing these pockets entirely outside of the case, the air or bellows chamber is not required to be reduced in area, as would be necessary if the music-receptacles were placed within the case.

At each end of the case, and outside thereof, is a large pocket, E, similar to the front pockets, D, and also provided with a hinged lid or cover, $h$, and intended to be used for like purposes. To the center of the front of the show-board or extended top C is secured an ornamental pocket, G, of the same style and shape as the front and end pockets, D E, and provided, like them, with a hinged lid or cover, $i$. In front of the pocket G, and within the side pieces $k\ k$ thereof, is pivoted, by means of pins $l$ fitting into slots $m$, Fig. 5, a music-rest, H, the bottom of which is drawn out so as to rest upon a desk, K, beneath it, (see Fig. 2,) when it will be properly inclined for supporting the music. When the music-rest is not required for use it is returned to its original position, as seen in Fig. 3, the slots $m$ admitting of these movements.

The desk K is formed of two portions, $n\ p$, hinged together, and may be thrown open, as seen in Fig. 3, for the use of composers, &c.; but this desk may be dispensed with, if desired, in which case the pocket would be so located that the bottom of the music-rest when drawn out would be supported by the top B of the case.

L is a leaf, composed of two portions, $q\ r$, hinged together at 8, and sliding in guides $s$, and through a narrow slit or aperture, $t$, immediately under the top B of the case. The front of the portion $q$ is provided with a knob, 9, and the rear portion, $r$, with stops 10, which serve to arrest the leaf as soon as its front portion is drawn out entirely clear of the slit $t$, when it will drop onto the fall-board M when the latter is drawn down, and be supported thereby in an inclined position for use as an ordinary writing-desk, which can be readily returned to its place under the top B by simply raising and sliding it back.

The front of the case over the key-board is closed by the fall-board M, which is curved in cross-section, and moves in the arc of a circle upon suitable guides $u$, secured to the inside of the ends of the case, by which construction the fall-board may be slid in under the top B, out of the way, instead of being thrown up and thereover, as would be the case were it hinged as heretofore.

By providing an organ or piano case with the auxiliary attachments above described its usefulness is increased, besides which it presents a unique appearance, and can be rendered highly ornamental, if desired.

What we claim as our invention, and desire to secure by Letters Patent, is—

1. In organ or piano cases, the music-rest H, arranged in front of the pocket G, and made adjustable by means of slots $m$ and pins $l$, in combination with a support thereunder for it to rest on when drawn out, substantially as described.

2. The sliding leaf L, composed of the two portions $q\ r$, hinged together and provided with one or more stops, 10, in combination with the fall-board M, which serves as a support for the front portion, $q$, of the leaf when drawn out, substantially as and for the purpose specified.

Witness our hands this 13th day of November, A. D. 1878.

P. JACOB HEYMANN.
JOHN E. BURT.

In presence of—
P. E. TESCHEMACHER,
W. J. CAMBRIDGE.